(12) United States Patent
Ouderkirk et al.

(10) Patent No.: US 6,888,675 B2
(45) Date of Patent: *May 3, 2005

(54) TRANSFLECTIVE DISPLAYS WITH REFLECTIVE POLARIZING TRANSFLECTOR

(75) Inventors: Andrew J. Ouderkirk, Woodbury, MN (US); Sanford Cobb, Jr., St. Mary's Point, MN (US); Brian D. Cull, Maplewood, MN (US); Michael F. Weber, Shoreview, MN (US); David L. Wortman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 829 days.

This patent is subject to a terminal disclaimer.

(21) Appl. No.: 09/781,639

(22) Filed: Feb. 12, 2001

(65) Prior Publication Data

US 2001/0008464 A1 Jul. 19, 2001

Related U.S. Application Data

(63) Continuation of application No. 09/490,879, filed on Jan. 24, 2000, now Pat. No. 6,262,842, which is a division of application No. 08/953,779, filed on Oct. 17, 1997, now Pat. No. 6,124,971, which is a continuation of application No. 08/494,776, filed on Jun. 26, 1995, now abandoned, application No. 09/781,639, filed on Feb. 12, 2001, which is a continuation-in-part of application No. 09/103,270, filed on Jun. 23, 1998, now abandoned, which is a continuation of application No. 08/402,349, filed on Mar. 10, 1995, now Pat. No. 5,828,488.

(51) Int. Cl.$^7$ ............................................. G02B 27/28
(52) U.S. Cl. ....................... 359/490; 359/498; 359/494; 359/495; 359/487
(58) Field of Search ................................ 359/483, 490, 359/495, 496, 498, 487, 494, 500

(56) References Cited

U.S. PATENT DOCUMENTS

| | | | |
|---|---|---|---|
| 540,768 A | 6/1895 | Western | |
| 1,610,423 A | 12/1926 | Cawley | ..................... 353/20 |
| 2,492,809 A | 12/1949 | Marks | ........................ 88/65 |
| 2,887,566 A | 5/1959 | Marks | ...................... 240/9.5 |
| 3,124,639 A | 3/1964 | Kahn | ........................... 88/65 |

(Continued)

FOREIGN PATENT DOCUMENTS

| | | |
|---|---|---|
| DE | 4121861 | 1/1992 |
| GB | 2028528 | 6/1979 |
| GB | 2052779 | 1/1981 |
| JP | 63168626 | 7/1988 |
| JP | 63181201 | 7/1988 |

(Continued)

OTHER PUBLICATIONS 3M, 3M Light Diffusing Film, Ad, Optical Systems, 3M (1993).

(Continued)

Primary Examiner—Audrey Chang
(74) Attorney, Agent, or Firm—Robert J. Pechman

(57) ABSTRACT

A transflector is described which increases efficiency and brightness under both ambient and supplemental lighting conditions in visual display applications. In one embodiment, the transflector includes a reflective polarizing element that reflects one polarization of light and transmits the other. In an alternate embodiment, the transflector includes a reflective polarizing element and a diffusing element such that the transflector diffusely reflects light of one polarization and transmits the other. The transflector is useful for both reflective and transflective liquid crystal displays.

9 Claims, 12 Drawing Sheets

U.S. PATENT DOCUMENTS

| | | | |
|---|---|---|---|
| 3,213,753 A | 10/1965 | Rogers | 88/65 |
| 3,528,723 A | 9/1970 | Rogers | 350/157 |
| 3,610,729 A | 10/1971 | Rogers | 350/157 |
| 3,647,612 A | 3/1972 | Schrenk et al. | 161/165 |
| 3,711,176 A | 1/1973 | Alfrey, Jr. et al. | 350/1 |
| 3,759,647 A | 9/1973 | Schrenk et al. | 425/131 |
| 3,773,882 A | 11/1973 | Schrenk | 264/171 |
| 3,801,429 A | 4/1974 | Schrenk et al. | 161/181 |
| 3,860,036 A | 1/1975 | Newman, Jr. | 138/45 |
| 4,025,688 A | 5/1977 | Nagy et al. | 428/350 |
| 4,094,947 A | 6/1978 | Alfrey, Jr. et al. | 264/171 |
| 4,268,127 A | 5/1981 | Oshima et al. | 350/337 |
| 4,310,584 A | 1/1982 | Cooper et al. | 428/212 |
| 4,315,258 A | 2/1982 | McKnight et al. | 340/784 |
| 4,427,741 A | 1/1984 | Aizawa et al. | 428/332 |
| 4,446,305 A | 5/1984 | Rogers et al. | 528/348 |
| 4,456,336 A | 6/1984 | Chung et al. | 350/338 |
| 4,500,173 A | 2/1985 | Leibowitz et al. | 350/345 |
| 4,515,441 A | 5/1985 | Wentz | 350/395 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,540,623 A | 9/1985 | Im et al. | 428/220 |
| 4,560,241 A * | 12/1985 | Stolove et al. | |
| 4,678,285 A | 7/1987 | Ohta et al. | 350/345 |
| 4,688,897 A | 8/1987 | Grinberg et al. | 350/336 |
| 4,720,426 A | 1/1988 | Englert et al. | 428/344 |
| 4,798,448 A | 1/1989 | van Raalte | 350/345 |
| 4,917,465 A | 4/1990 | Conner et al. | 350/335 |
| 4,937,134 A | 6/1990 | Schrenk et al. | 428/213 |
| 4,952,023 A | 8/1990 | Bradshaw et al. | 350/102 |
| 5,089,318 A | 2/1992 | Shetty et al. | 428/212 |
| 5,094,788 A | 3/1992 | Schrenk et al. | 264/171 |
| 5,094,793 A | 3/1992 | Schrenk et al. | 264/171 |
| 5,095,210 A | 3/1992 | Wheatley et al. | 250/339 |
| 5,103,337 A | 4/1992 | Schrenk et al. | 359/359 |
| 5,122,905 A | 6/1992 | Wheatley et al. | 359/586 |
| 5,122,906 A | 6/1992 | Wheatley | 359/586 |
| 5,126,880 A | 6/1992 | Wheatley et al. | 359/587 |
| 5,149,578 A | 9/1992 | Wheatley et al. | 428/213 |
| 5,157,526 A | 10/1992 | Kondo et al. | 359/63 |
| 5,159,478 A | 10/1992 | Akiyama et al. | 359/69 |
| 5,188,760 A | 2/1993 | Hikmet et al. | 252/299.01 |
| 5,202,074 A | 4/1993 | Schrenk et al. | 264/241 |
| 5,211,878 A | 5/1993 | Reiffenrath et al. | 252/299.63 |
| 5,217,794 A | 6/1993 | Schrenk | 428/220 |
| 5,233,465 A | 8/1993 | Wheatley et al. | 359/359 |
| 5,234,729 A | 8/1993 | Wheatley et al. | 428/30 |
| 5,235,443 A | 8/1993 | Barnik et al. | 359/37 |
| 5,255,029 A | 10/1993 | Vogeley et al. | 353/122 |
| 5,269,995 A | 12/1993 | Ramanathan et al. | 264/171 |
| 5,278,694 A | 1/1994 | Wheatley et al. | 359/359 |
| 5,294,657 A | 3/1994 | Melendy et al. | 524/270 |
| RE34,605 E | 5/1994 | Schrenk et al. | 359/359 |
| 5,316,703 A | 5/1994 | Schrenk | 264/1.3 |
| 5,319,478 A | 6/1994 | Fünfschilling et al. | 359/53 |
| 5,325,218 A | 6/1994 | Willett et al. | 359/53 |
| 5,333,072 A | 7/1994 | Willett | 359/41 |
| 5,339,179 A | 8/1994 | Rudisill et al. | 359/49 |
| 5,339,198 A | 8/1994 | Wheatly et al. | 359/359 |
| 5,359,691 A | 10/1994 | Tai et al. | 385/146 |
| 5,360,659 A | 11/1994 | Arends et al. | 428/216 |
| 5,389,324 A | 2/1995 | Lewis et al. | 264/171 |
| 5,422,756 A | 6/1995 | Weber | 359/487 |
| 5,424,119 A | 6/1995 | Phillips et al. | 428/328 |
| 5,448,404 A | 9/1995 | Schrenk et al. | 359/584 |
| 5,451,449 A | 9/1995 | Shetty et al. | 428/195 |
| 5,473,454 A | 12/1995 | Blancsard | |
| 5,486,884 A | 1/1996 | De Vaan | 353/122 |
| 5,486,935 A | 1/1996 | Kalmanash | 359/37 |
| 5,486,949 A * | 1/1996 | Schrenk et al. | 359/498 |
| 5,540,978 A | 7/1996 | Schrenk | 428/212 |
| 5,550,660 A | 8/1996 | Yang | 359/63 |
| 5,552,927 A | 9/1996 | Wheatly et al. | 359/359 |
| 5,559,634 A | 9/1996 | Weber | 359/638 |
| 5,568,316 A | 10/1996 | Schrenk et al. | 359/584 |
| 5,570,213 A | 10/1996 | Ruiz et al. | 359/72 |
| 5,579,159 A | 11/1996 | Ito | 359/487 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,825,542 A | 10/1998 | Cobb, Jr. et al. | 359/487 |
| 5,825,543 A | 10/1998 | Ouderkirk et al. | 359/494 |
| 5,828,488 A * | 10/1998 | Ouderkirk et al. | 359/495 |
| 5,882,774 A | 3/1999 | Jonza et al. | 428/212 |
| 5,940,149 A | 8/1999 | Vanderwerf | 349/5 |
| 5,962,114 A | 10/1999 | Jonza et al. | 428/212 |
| 5,965,247 A | 10/1999 | Jonza et al. | 428/212 |
| 6,025,897 A * | 2/2000 | Weber et al. | 349/96 |
| 6,124,971 A * | 9/2000 | Ouderkirk et al. | 359/487 |

FOREIGN PATENT DOCUMENTS

| | | |
|---|---|---|
| JP | 4141603 | 5/1992 |
| JP | 4184429 | 7/1992 |
| JP | 5288910 | 11/1993 |
| JP | 611607 | 1/1994 |
| JP | 7216328 | 8/1995 |
| WO | WO 91/09719 | 7/1991 |
| WO | WO 94/11776 | 5/1994 |
| WO | WO 94/29765 | 12/1994 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 96/31794 | 10/1996 |
| WO | WO 97/01440 | 1/1997 |
| WO | WO 97/01774 | 1/1997 |
| WO | WO 97/01781 | 1/1997 |
| WO | WO 97/01789 | 1/1997 |
| WO | WO 97/32226 | 9/1997 |
| WO | WO 99/36248 | 7/1999 |
| WO | WO 99/36262 | 7/1999 |

OTHER PUBLICATIONS

IBM, Light Diffuser with Controlled Divergence, IBM Technical Disclosure Bulletin, vol. 29, No. 1, p. 276–279 (Jun. 1986).

Im, J. et al., Coextruded Microlayer Film and Sheet, Journal of Plastic Film and Sheeting, vol. 4, p. 104–115 (Apr. 1988).

Schrenk et al., Coextruded Multilayer Polymer Films and Sheet, Chapt. 15, Polymer Blends, vol. 2, 129, Academic Press, Inc. (1978).

Schrenk, W., New Developments in Coextrusion, International Conference on Advances in Polymer Processing, New Orleans, LA (Apr. 1991).

Schrenk W. et al., Coextruded Iridescent Film, TAPPI Paper Synthetics Conference, Atlanta, GA, p. 141–145 (Sep. 27–29, 1976).

Schrenk, W. et al., Coextruded Infrared Reflecting Films, $7^{th}$ Annual Meeting Polymer Processing Society, Hamilton, Ontario, Canada p. 222–223 (Apr. 1991).

Weber, M., P–61: Retroreflecting Sheet Polarizer, SID 93 Digest pp. 669–672 (1993).

Weber, M., 23:3: Retroreflecting Sheet Polarizer, SID 92 Digest, p. 427–9 (1992).

* cited by examiner

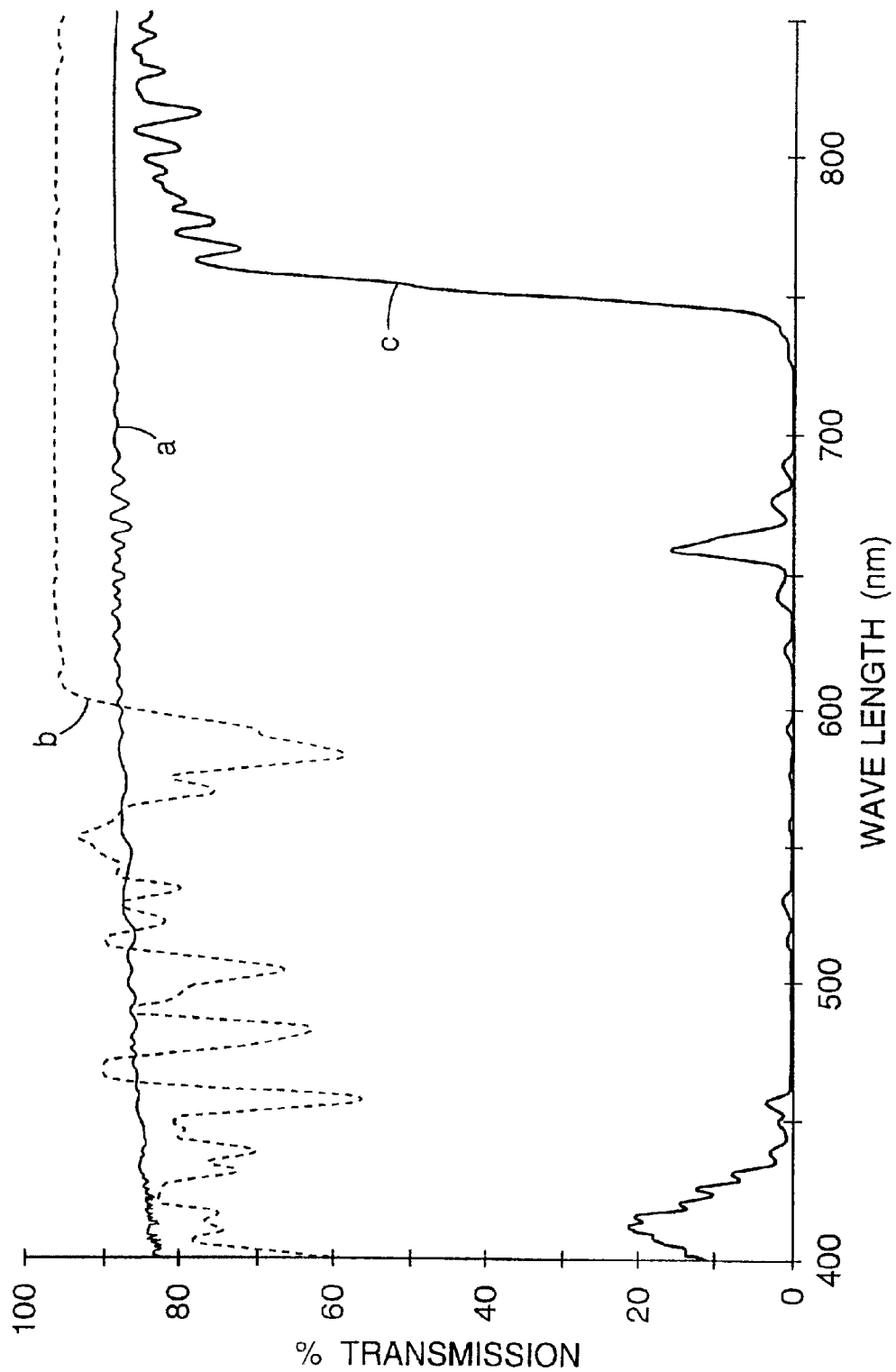

TRANSFLECTIVE DISPLAYS WITH REFLECTIVE POLARIZING TRANSFLECTOR

CROSS-REFERENCE TO RELATED APPLICATIONS

This application is a continuation of assignee's application Ser. No. 09/490,879 filed Jan. 24, 2000 now U.S. Pat. No. 6,262,842, which is a divisional of assignee's application Ser. No. 08/953,779 filed Oct. 17, 1997, now U.S. Pat. No. 6,124,971, which is a continuation of assignee's application Ser. No. 08/494,776 filed Jun. 26, 1995, now abandoned. This application is also a continuation-in-part of assignee's application Ser. No. 09/103,270 filed Jun. 23, 1998 now abandoned, which is a continuation of assignee's application Ser. No. 08/402,349 filed Mar. 10, 1995, now U.S. Pat. No. 5,828,488.

BACKGROUND

The physical downsizing of microprocessor based technologies has led to portable personal computers, pocket secretaries, wireless phones and pagers. All of these devices, and also other devices such as clocks, watches, calculators, etc., have the common need for a low power consumption data display screen to extend the useful working time between battery replacements or battery charges.

The common Liquid Crystal Display (LCD) is often used as the display for such devices. LCDs can be classified based upon the source of illumination. Reflective displays are illuminated by ambient light that enters the display from the front. A reflective surface, such as a brushed aluminum or silver reflector placed behind the LCD assembly, returns light to illuminate the LCD assembly while preserving the polarization orientation of the light incident on the reflective surface. Although reflective displays meet the need for low power consumption, the displays often appear rather dark and are therefore difficult to read. In addition, there are many conditions where there is insufficient ambient light for viewing the display. The purely reflective display is thus limited in usefulness.

In applications where the intensity of ambient light is insufficient for viewing, supplemental lighting, such as a backlight assembly, is used to illuminate the display. The typical backlight assembly includes an optical cavity and a lamp, LED or other structure that generates light. Although supplemental lighting can illuminate a display regardless of ambient lighting conditions, it is an expensive drain on battery life. Thus, the batteries on portable computers, for example, must typically be recharged after 2 to 4 hours of continuous backlight use.

In an attempt to overcome the above described drawbacks of reflective and transmissive displays, some electronic displays have been designed to use ambient light when available and backlighting only when necessary. This dual function of reflection and transmission leads to the designation, "transflective". One problem with currently available transflective displays is that they have good performance in either reflective or transmissive mode, but not both. This stems from the fact that the backlight assembly is not as efficient a reflector as the back reflector traditionally used in a purely reflective display, and the display thus appears less bright when viewed under ambient light. In addition, many devices with small display screens, such as pagers, use reflective LCDs with a supplemental electroluminescent backlight for low ambient light conditions. The LCD is backed with a plastic film that is partially reflective and partially transmitting. However, the reflective film is only on the order of 50–70% reflective and 20–40% transmissive, and thus is not efficient for either ambient or supplemental lighting conditions.

Another limiting feature of conventional LCDs are the dichroic polarizers conventionally used on both the front side and the rear of the LCD panel. These polarizers most commonly use a dichroic dyed, oriented polymer polarizer that strongly absorbs one polarization of light (>99%) and weakly absorbs the other polarization (5–20%). Liquid crystal displays use two sheets of this type of polarizer combined with a liquid crystal panel to selectively allow transmission of light. The absorption by the dichroic polarizers greatly reduces the brightness and contrast in both reflective and backlit displays.

A transflective display can be made by placing a transflective film between the rear polarizer and the backlight. The transflective film provides a specified trade-off between reflectivity for ambient lighting and transmission for backlit operation. In general, because of the high absorption by the two dichroic polarizers and the transflector, transflective displays are generally not as bright as either purely reflective or purely backlit displays.

Thus, there is a need in the art for visual displays which are more efficient, have low power consumption, and which provide better brightness and increased contrast to produce a more easily read display under both ambient and supplemental lighting conditions.

SUMMARY

To overcome the problems in the art described above, and to overcome other deficiencies which will become apparent upon reading and understanding the present specification, a transflector is described which increases efficiency and brightness under both ambient and supplemental lighting conditions in visual display applications. In one embodiment, the transflector includes a reflective polarizing element that reflects one polarization of light and transmits the other. In an alternate embodiment, the transflector includes a reflective polarizing element and a diffusing element such that the transflector diffusely reflects light of one polarization and transmits the other. The transflector is useful for both reflective and transflective liquid crystal displays. In use, the transflector is placed between a backlight (such as a light pipe, electroluminescent panel, etc.) and an LCD assembly, with the reflective polarizing side toward the backlight. In this configuration, the transflector serves as an efficient reflector of ambient light and an efficient transmitter of light from the backlight, thus resulting in increased display brightness while meeting the need for low power consumption.

BRIEF DESCRIPTION OF THE DRAWINGS

In the drawings, where like numerals refer to like elements throughout the several views:

FIGS. 3–6, 6A and 6B show transmission spectra of the multilayer optical film of Examples 1–6.

DETAILED DESCRIPTION

Figure 1:
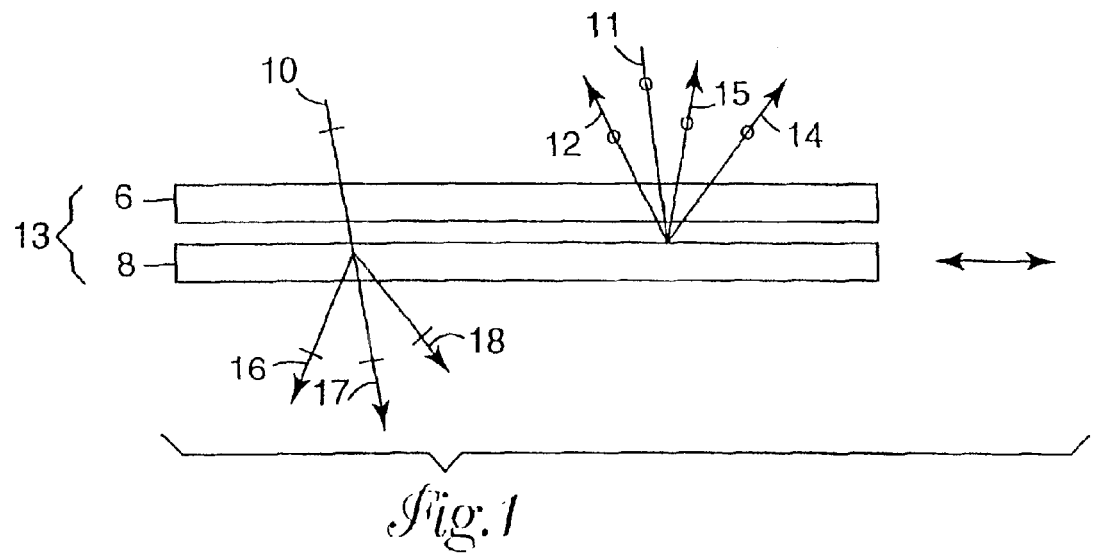
FIG. 1 shows a block diagram of the present transflector.

The present transflector 13 is shown in FIG. 1. Transflector 13 includes a diffusing element 6 and a reflective polarizing element 8. The preferred reflective polarizing element is based on an oriented multilayer stack comprising alternating layers of two materials, such as that described in the copending and commonly assigned U.S. patent application Ser. No. 08/402,041, entitled "OPTICAL FILM", filed Mar. 10, 1995, which is incorporated herein by reference.

Referring again to FIG. 1, the diffusing element 6 preferably reduces the specular reflectivity of reflective polarizing element 8 for the reflected polarization without substantially increasing the reflectivity of the reflective polarizing element or lessening the polarizing efficiency for the transmitted polarization. In other words, the diffusing element 8 is preferably polarization preserving in that it does not randomize the polarization of the light that is either reflected or transmitted by the reflective polarizing element 8. Ideally, the diffusing element 6 has a high degree of forward scattering of light, i.e., low reflectivity. This is beneficial for preserving maximum selectivity of polarized light for the reflective polarizing element. Varying levels of diffusion can be used depending on the application, ranging from almost no diffusion (specular) to a very heavy amount of diffusion (lambertian). Several diffusers are suitable for this application, including translucent case polymers such as polyethylene and polypropylene. Also suitable are replicated structures proximate to the reflective polarizing element, such as random and regular lenslet arrays, extended 2D and 3D prismatic structures, random structures such as patterns replicated from brushed or bead-blasted surfaces, and combinations thereof. Other diffusers will work as well, such as coatings of polarization preserving diffusers, and embossing patterns onto the reflective polarizing element. The diffusing element 6 can either be a separate optical element or be directly applied or laminated to the surface of the reflective polarizing element. In some displays, an elliptical diffuser that scatters light asymmetrically provides good performance. In addition, diffusing adhesives can be used as the diffusing element. In this case, the diffusing adhesive also can be used to laminate the reflective polarizing element to the back of the LCD or other system components. Eliminating the air gap between system components reduces surface reflections, thus improving system performance.

The preferred reflective polarizing element is a multilayer optical film.

I. Multilayer Optical Film

The transflective displays described herein rely on the unique and advantageous properties of multilayer optical films. The advantages, characteristics and manufacturing of such films are most completely described in the above mentioned copending and commonly assigned U.S. patent application Ser. No. 08/402,041, filed Mar. 10, 1995, titled OPTICAL FILM, which is incorporated herein by reference. The multilayer optical film is useful, for example, as highly efficient mirrors and/or polarizers. A relatively brief description of the properties and characteristics of the multilayer optical film is presented below followed by a description of illustrative embodiments of backlight systems using the multilayer optical film according to the present invention.

Multilayer optical films as used in conjunction with the present invention exhibit relatively low absorption of incident light, as well as high reflectivity for off-axis as well as normal light rays. These properties generally hold whether the films are used for pure reflection or reflective polarization of light. The unique properties and advantages of the multi-layer optical film provides an opportunity to design highly efficient backlight systems which exhibit low absorption losses when compared to known backlight systems.

Figure 2A:
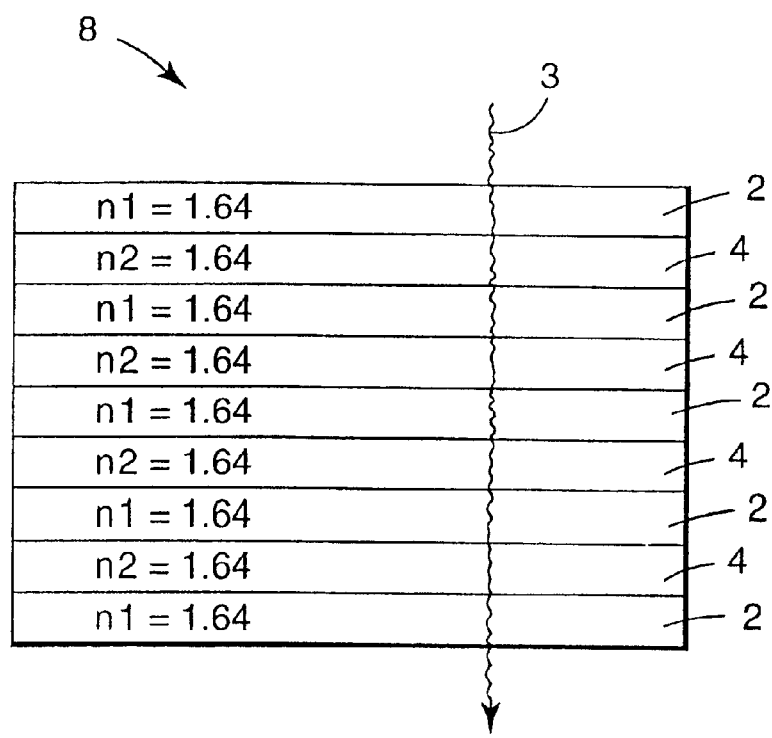
FIGS. 2A, 2B and 2C show the preferred reflective polarizing element.
Figure 2B:
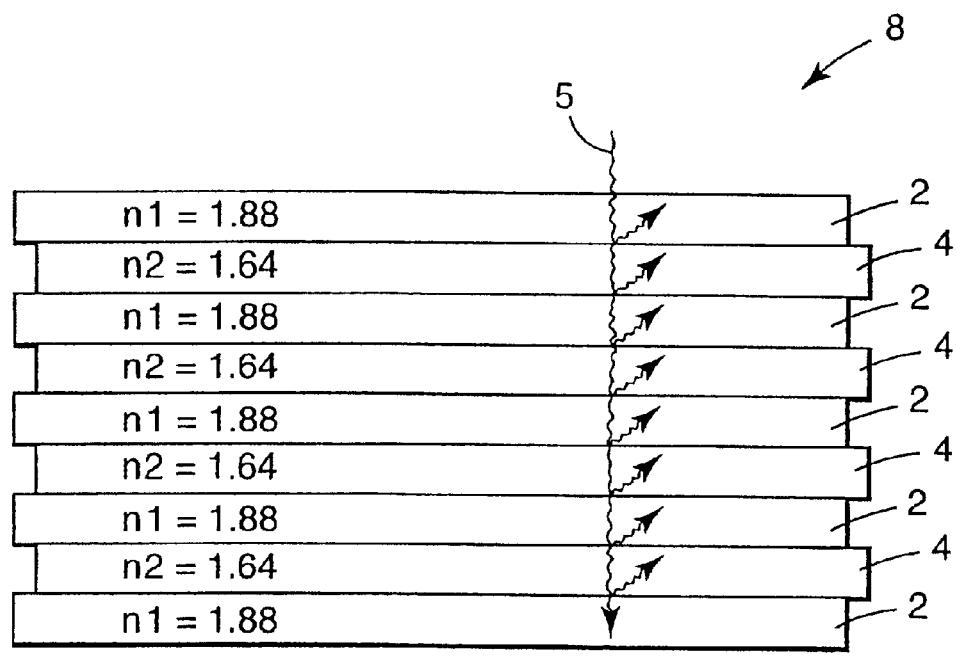

An exemplary multilayer optical film of the present invention as illustrated in FIGS. 2A and 2B includes a multilayer stack 8 having alternating layers of at least two materials 2 and 4. At least one of the materials has the property of stress induced birefringence, such that the index of refraction (n) of the material is affected by the stretching process. FIG. 2A shows an exemplary multilayer stack before the stretching process in which both materials have the same index of refraction. Light ray 3 experiences no index of refraction change and passes through the stack. In FIG. 2B, the same stack has been stretched, thus increasing the index of refraction of material 2. The difference in refractive index at each boundary between layers will cause part of ray 5 to be reflected. By stretching the multilayer stack over a range of uniaxial to biaxial orientation, a film is created with a range of reflectivities for differently oriented plane-polarized incident light. The multilayer stack can thus be made useful as reflective polarizers or mirrors.

Multilayer optical films constructed according to the present invention exhibit a Brewster angle (the angle at which reflectance goes to zero for light incident at any of the layer interfaces) which is very large or is nonexistent. In contrast, known multilayer polymer films exhibit relatively small Brewster angles at layer interfaces, resulting in transmission of light and/or undesirable iridescence. The multilayer optical films according to the present invention, however, allow for the construction of mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

Figure 2C:
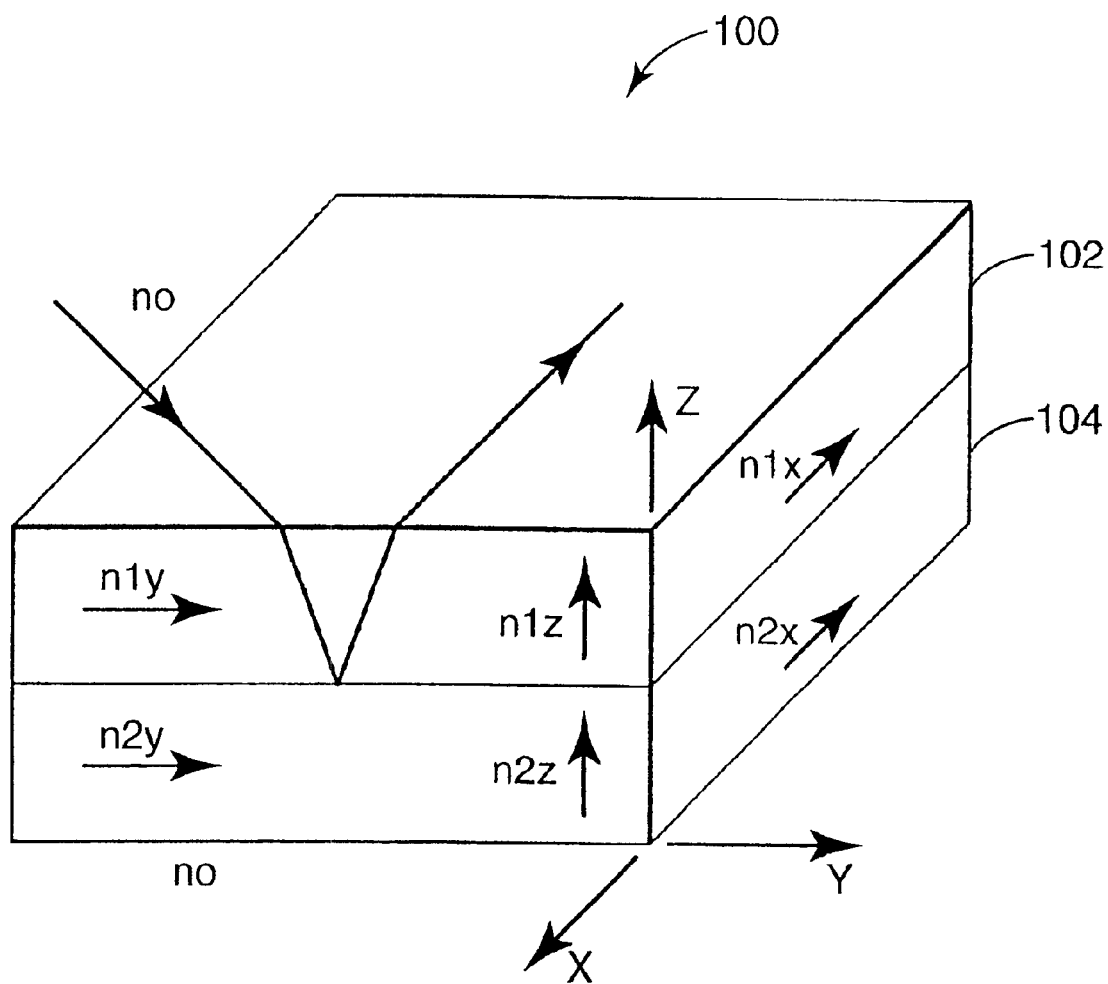

FIG. 2C shows two layers of a multilayer stack, and indicates the three dimensional indices of refraction for each layer. The indices of refraction for each layer are n1x, n1y, and n1z for layer 102, and n2x, n2y, and n2z for layer 104. The relationships between the indices of refraction in each film layer to each other and to those of the other layers in the film stack determine the reflectance behavior of the multilayer stack at any angle of incidence, from any azimuthal direction. The principles and design considerations described in U.S. patent application Ser. No. 08/402,041 can be applied to create multilayer stacks having the desired optical effects for a wide variety of circumstances and applications. The indices of refraction of the layers in the multilayer stack can be manipulated and tailored to produce the desired optical properties.

Referring again to FIG. 2B, the multilayer stack 8 can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multilayer stack is comprised of low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers in the multilayer stack having an average thickness of not more than 0.5 microns.

In those applications where reflective films (e.g. mirrors) are desired, the desired average transmission for light of each polarization and plane of incidence generally depends upon the intended use of the reflective film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400–700 nm) is desirably less than 10% (reflectance greater than 90%), preferably less than 5% (reflectance greater than 95%), more preferably less than 2% (reflectance greater than 98%), and even more preferably less than 1% (reflectance greater than 99%). The average transmission at 60 degrees from the normal from 400–700 nm is desirably less than 20% (reflectance greater than 80%), preferably less than 10% (reflectance greater than 90%), more preferably less than 5% (reflectance greater than 95%), and even more preferably less than 2% (reflectance greater than 98%), and even more preferably less than 1% (reflectance greater than 99%).

In addition, asymmetric reflective films may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g, 400–850 nm).

Multilayer optical films can also be designed to operate as reflective polarizers. One way to produce a multilayer reflective polarizer is to uniaxially stretch a multilayer stack which contains a birefringent material as the high index layer of the low/high index pair. The resulting reflective polarizers have high reflectivity for light with its plane of polarization parallel to one axis (in the stretch direction) for a broad range of angles of incidence, and simultaneously have low reflectivity and high transmissivity for light with its plane of polarization parallel to the other axis (in the non-stretch direction) for a broad range of angles of incidence. By controlling the three indices of refraction of each film, nx, ny and nz, the desired polarizer behavior can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest.

The average transmission at normal incidence for a polarizer in the transmission axis across the visible spectrum (400–700 nm for a bandwidth of 300 nm) is desirably at least 50%, preferably at least 70%, more preferably at least 85%, and even more preferably at least 90%. The average transmission at 60 degrees from the normal (measured along the transmission axis for p-polarized light) for a polarizer from 400–700 nm is desirably at least 50%, preferably at least 70%, more preferably at least 80%, and even more preferably at least 90%.

The average transmission for a multilayer reflective polarizer at normal incidence for light polarized in the direction of the extinction axis across the visible spectrum (400–700 nm for a bandwidth of 300 nm) is desirably at less than 50%, preferably less than 30%, more preferably less than 15%, and even more preferably less than 5%. The average transmission at 60 degrees from the normal (measured along the transmission axis for p-polarized light) for a polarizer for light polarized in the direction of the extinction axis from 400–700 nm is desirably less than 50%, preferably less than 30%, more preferably less than 15%, and even more preferably less than 5%.

For certain applications, high reflectivity for p-polarized light with its plane of polarization parallel to the transmission axis at off-normal angles are preferred. The average reflectivity for light polarized along the transmission axis should be more than 20% at an angle of at least 20 degrees from the normal.

In addition, although reflective polarizing films and asymmetric reflective films are discussed separately herein, it should be understood that two or more of such films could be provided to reflect substantially all light incident on them (provided they are properly oriented with respect to each other to do so). This construction is typically desired when the multilayer optical film is used as a reflector in a backlight system according to the present invention.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, can be determined according to the equation:

$$C_{RMS} = \frac{\int_{\lambda 1}^{\lambda 2} \left((T - \bar{T})^2\right)^{1/2} d\lambda}{\bar{T}}$$

where the range λ1 to λ2 is the wavelength range, or bandwidth, of interest, T is the transmissivity along the transmission axis, and $\bar{T}$ is the average transmissivity along the transmission axis in the wavelength range of interest. For applications where a low color polarizer is desirable, the % RMS color should be less than 10%, preferably less than 8%, more preferably less than 3.5%, and even more preferably less than 2% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than 3%.

Materials Selection and Processing

With the design considerations described in the above mentioned U.S. patent application Ser. No. 08/402,041, one of ordinary skill will readily appreciate that a wide variety of materials can be used to form multilayer reflective films or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite of the first material. Or, the second material may have no birefringence, or less birefringence than the first material.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof, (b) isophthalic acid, or esters thereof, (c) phthalic acid, or esters thereof, (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of reflective films include PET/Ecdel, PEN/Ecdel, PEN/sPS, PEN/THV, PEN/co-PET, and PET/sPS, where "co-PET" refers to a copolymer or blend based upon terephthalic acid (as described above), Ecdel is a thermoplastic polyester commercially available from Eastman Chemical Co., and THV is a fluoropolymer commercially available from Minnesota Mining and Manufacturing Company, St. Paul, Minn.

The number of layers in the film is selected to achieve the desired optical properties using the minimum number of layers for reasons of film thickness, flexibility and economy. In the case of both polarizers and reflective films, the number of layers is preferably less than 10,000, more preferably less than 5,000, and even more preferably less than 2,000.

As discussed above, the ability to achieve the desired relationships among the various indices of refraction (and thus the optical properties of the multilayer film) is influenced by the processing conditions used to prepare the multilayer film. In the case of organic polymers which can be oriented by stretching, the films are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of reflective films the film is stretched substantially in two directions (biaxial orientation).

The film may be allowed to dimensionally relax in the cross-stretch direction from the natural reduction in cross-stretch (equal to the square root of the stretch ratio), it may simply be constrained to limit any substantial change in cross-stretch dimension; or it may be actively stretched in the cross-stretch dimension. The film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratios in the range from 1:2 to 1:10 (more preferably 1:3 to 1:7) in the stretch direction and from 1:0.2 to 1:10 (more preferably from 1:0.3 to 1:7) orthogonal to the stretch direction is preferred.

Suitable multilayer films may also be prepared using techniques such as spin coating (e.g., as described in Boese et al., J. Polym. Sci.: Part B, 30:1321 (1992) for birefringent polyimides, and vacuum deposition (e.g., as described by Zang et. al., Appl. Phys. Letters, 59:823 (1991) for crystalline organic compounds; the latter technique is particularly useful for certain combinations of crystalline organic compounds and inorganic materials.

Exemplary multilayer reflective mirror films and multilayer reflective polarizers will now be described in the following examples.

EXAMPLE 1

PEN:THV 500, 449, Mirror

A coextruded film containing 449 layers was made by extruding the cast web in one operation and later orienting the film in a laboratory film-stretching apparatus. A Polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 3:
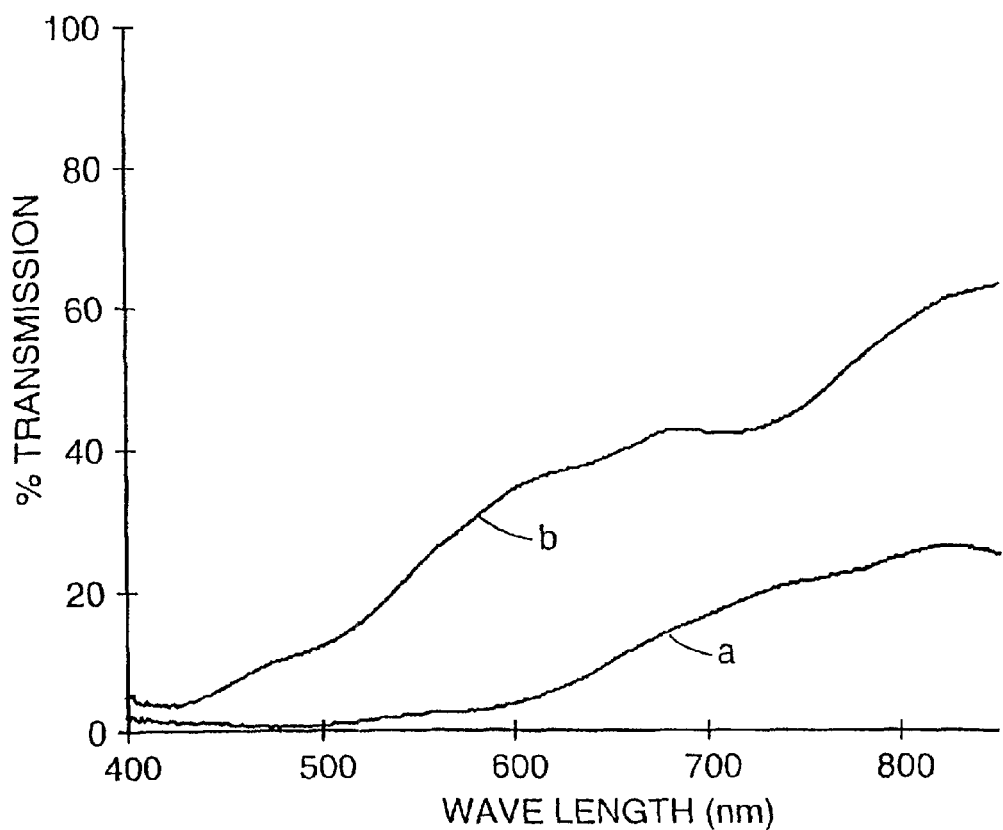

FIG. 3 shows the transmission of this multilayer film. Curve (a) shows the response at normal incidence, while curve (b) shows the response at 60 degrees for p-polarized light.

EXAMPLE 2

PEN:PMMA, 601, Mirror

A coextruded film containing 601 layers was made on a sequential flat-film-making line via a coextrusion process. Polyethylene Naphthalate (PEN) with an Intrinsic Viscosity of 0.57 dl/g (60 wt. % phenol/40 wt. % dichlorobenzene) was delivered by extruder A at a rate of 114 pounds per hour with 64 pounds per hour going to the feedblock and the rest going to skin layers described below. PMMA (CP-82 from ICI of Americas) was delivered by extruder B at a rate of 61 pounds per hour with all of it going to the feedblock. PEN was on the skin layers of the feedblock. The feedblock method was used to generate 151 layers using the feedblock such as those described in U.S. Pat. No. 3,801,429, after the feedblock two symmetric skin layers were coextruded using extruder C metering about 30 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another device that coextruded skin layers at a total rate of 50 pounds per hour of PEN from extruder A. The web was length oriented to a draw ratio of about 3.2 with the web temperature at about 280° F. The film was subsequently preheated to about 310° F. in about 38 seconds and drawn in the transverse direction to a draw ratio of about 4.5 at a rate of about 11% per second. The film was then heat-set at 440° F. with no relaxation allowed. The finished film thickness was about 3 mil.

Figure 4:
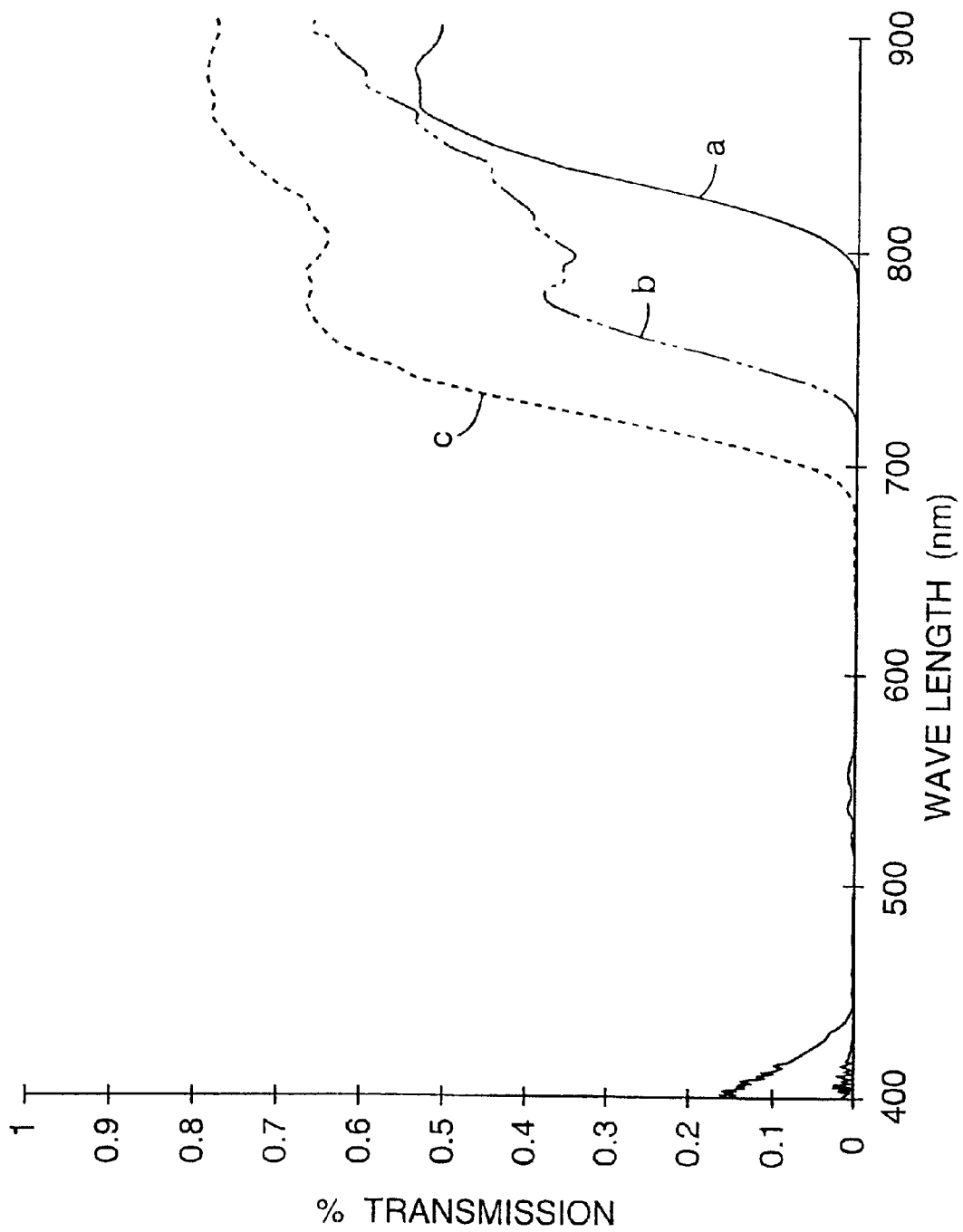

As seen in FIG. 4, curve (a), the bandwidth at normal incidence is about 350 nm with an average in-band extinction of greater than 99%. The amount of optical absorption is difficult to measure because of its low value, but is less than 1%. At an incidence angle of 50° from the normal both s (curve (b)) and p-polarized (curve (c)) light showed similar extinctions, and the bands were shifted to shorter wavelengths as expected. The red band-edge for s-polarized light is not shifted to the blue as much as for p-polarized light due to the expected larger bandwidth for s-polarized light, an due to the lower index seen by the p-polarized light in the PEN layers.

EXAMPLE 3

PEN:PCTG, 449, Polarizer

A coextruded film containing 481 layers was made by extruding the cast web in one operation and later orienting the film in a laboratory film-stretching apparatus. The feedblock method was used with a 61 layer feedblock and three (2×) multipliers. Thick skin layers were added between the final multiplier and the die. Polyethylene naphthalate (PEN) with an intrinsic viscosity of 0.47 dl/g (60 wt. % phenol/40 wt. % dichlorobenzene) was delivered to the feedblock by one extruder at a rate of 25.0 pounds per hour. Glycol modified polyethylene dimethyl cyclohexane terephthalate (PCTG 5445 from Eastman) was delivered by another extruder at a rate of 25.0 pounds per hour. Another stream of PEN from the above extruder was added as skin layers after the multipliers at a rate of 25.0 pounds per hour. The cast web was 0.007 inches thick and 12 inches wide. The web was layer uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching was then commenced at 20%/second (based on original dimensions) until the sample was stretched to about 6:1 (based on gripper to gripper measurements). Immediately after stretching, the sample was cooled by blowing room temperature air at it. In the center, the sample was found to relax by a factor of 2.0.

Figure 5:
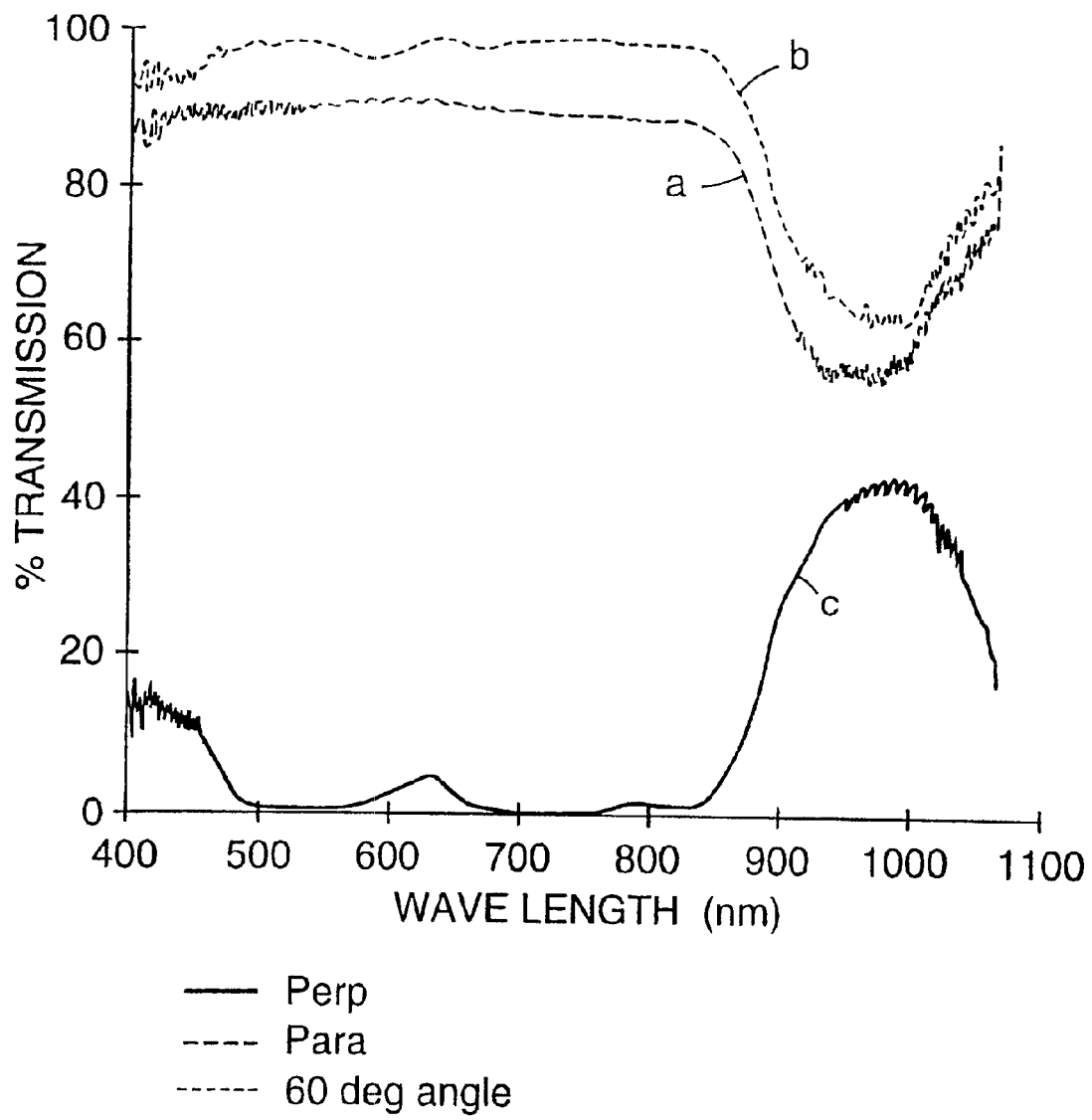

FIG. 5 shows the transmission of this multilayer film where curve a shows transmission of light polarized in the non-stretch direction at normal incidence, curve b shows transmission of p-polarized light polarized in the non-stretched direction at 60° incidence, and curve c shows the transmission of light polarized in the stretch direction at normal incidence. Average transmission for curve a from 400–700 nm is 89.7%, average transmission for curve b from 400–700 nm is 96.9%, and average transmission for curve c from 400–700 nm is 4.0%. % RMS color for curve a is 1.05%, and % RMS color for curve b is 1.44%.

EXAMPLE 4

PEN:CoPEN, 601, Polarizer

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 15% dimethyl isophthalate and 15% dimethyl terephthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 6:
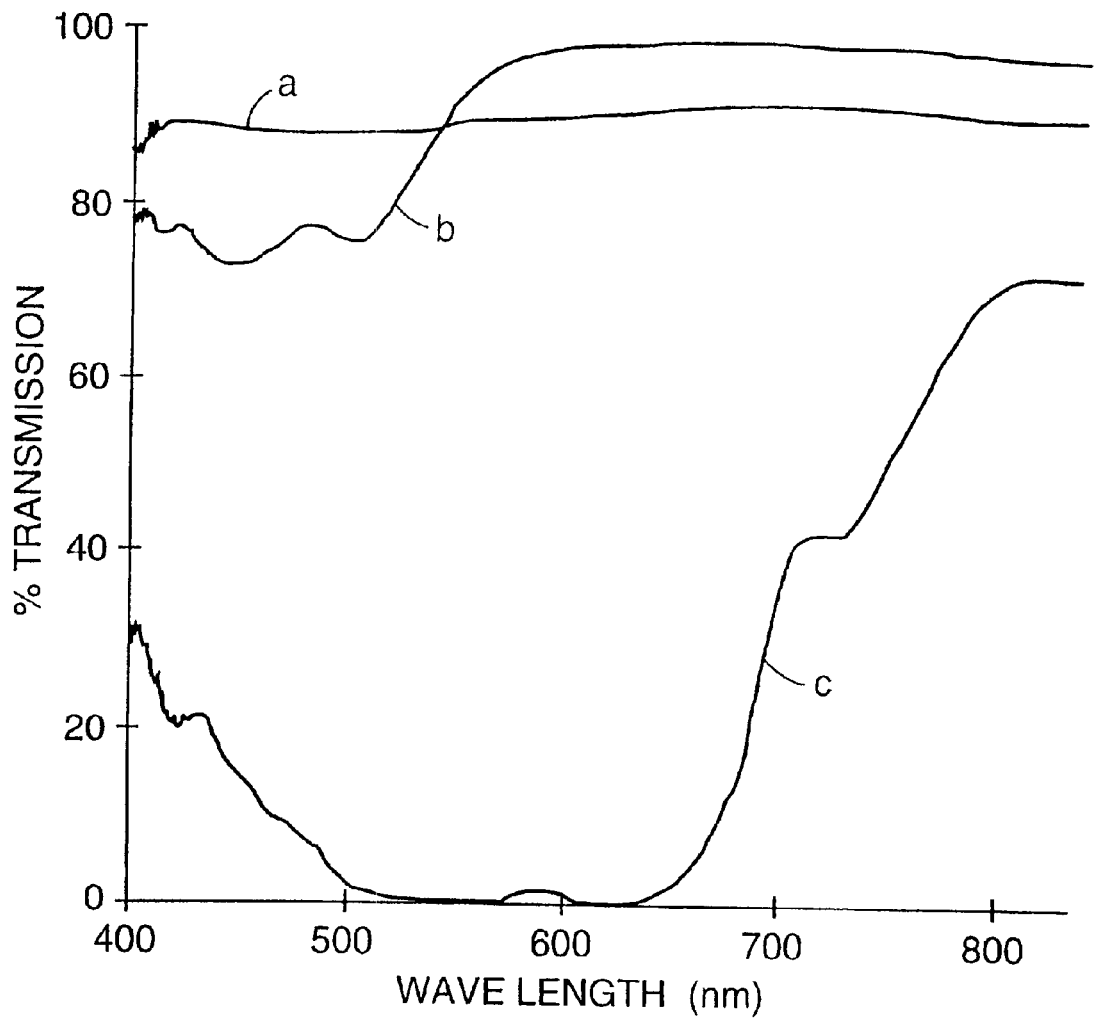

FIG. 6 shows the transmission for this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light in the non-stretch direction at both normal and 60° incidence (80–100%). Also note the very high reflectance of light polarized in the stretched direction in the visible range (400–700 nm) shown by curve c. Reflectance is nearly 99% between 500 and 650 nm.

EXAMPLE 5

PEN:sPS, 481, Polarizer

A 481 layer multilayer film was made from a polyethylene naphthalate (PEN) with an intrinsic viscosity of 0.56 dl/g measured in 60 wt. % phenol and 40 wt % dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2×) multipliers were used. Equal thickness skin layers containing the same PEN fed to the feedblock were added after the final multiplier at a total rate of 22 pounds per hour. The web was extruded through a 12" wide die to a thickness of about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 6A:
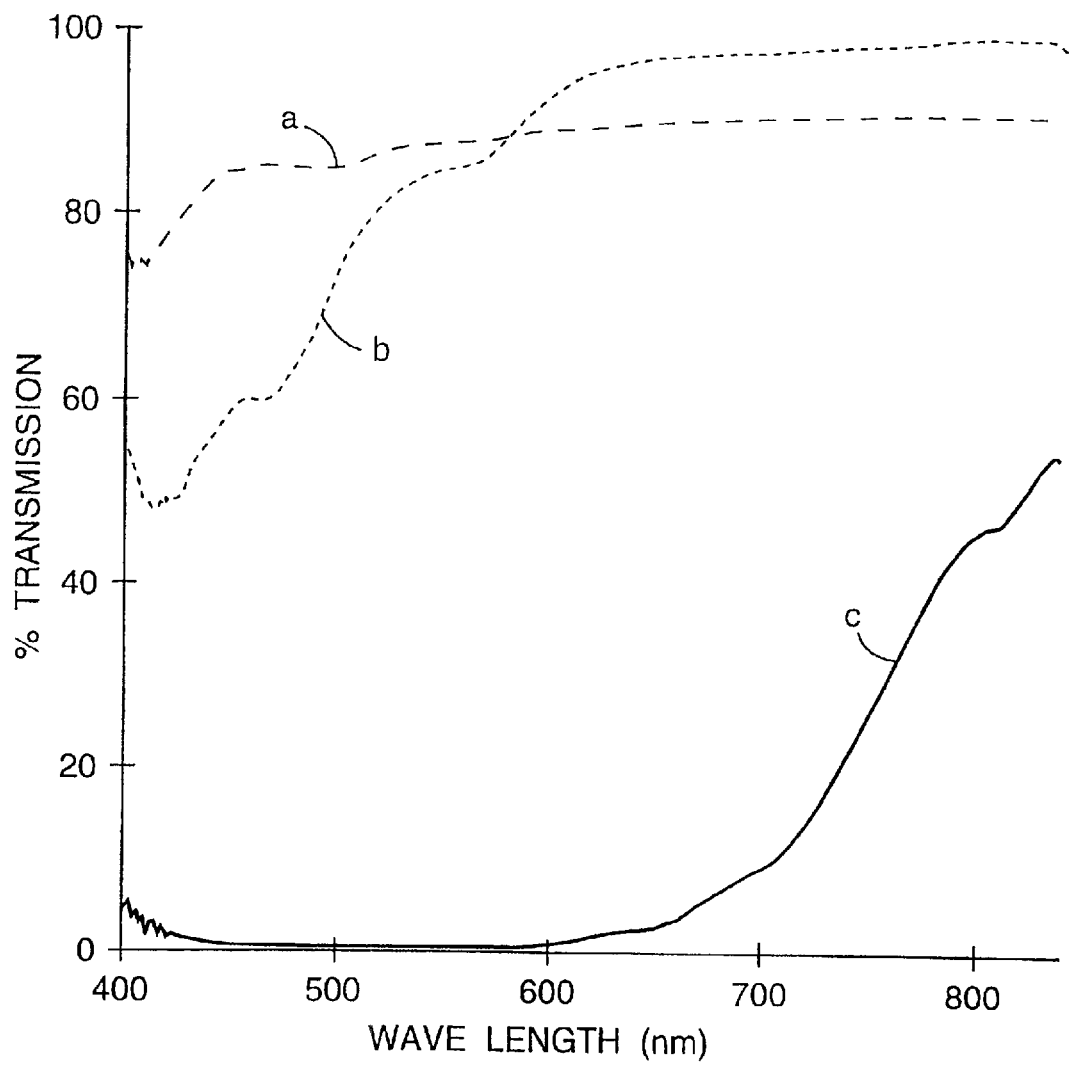

FIG. 6A shows the optical performance of this PEN:sPS reflective polarizer containing 481 layers. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. Average transmission for curve a over 400–700 nm is 86.2%, the average transmission for curve b over 400–700 nm is 79.7%. Also note the very high reflectance of light polarized in the stretched direction in the visible range (400–700 nm) shown by curve c. The film has an average transmission of 1.6% for curve c between 400 and 700 nm. The % RMS color for curve a is 3.2%, while the % RMS color for curve b is 18.2%.

EXAMPLE 6

PEN:coPEN, 603, Polarizer

A reflecting polarizer comprising 603 layers was made on a sequential flat-film making line via a coextrusion process. A polyethylene naphthalate (PEN) with an intrinsic viscosity of 0.47 dl/g (in 60 wt % phenol plus 40 wt % dichlorobenzene) was delivered by an extruder at a rate of 83 pounds (38 kg) per hour and the CoPEN was delivered by another extruder at 75 pounds (34 kg) per hour. The CoPEN was a copolymer of 70 mole %, 2,6 naphthalene dicarboxylate methyl ester, 15 mole % dimethyl terephthalate, and 15 mole % dimethyl isophthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. This optical stack was multiplied by two sequential multipliers. The nominal multiplication ratio of the multipliers was 1.2 and 1.4, respectively. Between the final multiplier and the die, skin layers were added composed of the same CoPEN described above, delivered by a third extruder at a total rate of 106 pounds (48 kg) per hour. The film was subsequently preheated to 300° F. (150° C.) in about 30 seconds and drawn in the transverse direction to a draw ratio of approximately 6 at an initial rate of about 20% per second. The finished film thickness was approximately 0.0035 inch (0.089 mm).

FIG. 6B shows the optical performance of the polarizer of Example 6. Curve a shows transmission of light polarized in the non-stretch direction at normal incidence, curve b shows transmission of p-polarized light in the nonstretch direciton at 50 degree angle of incidence, and curve c shows transmission of light polarized in the stretch direction at normal incidence. Note the very high transmission of light polarized in the non-stretch direction. Average transmission for curve a over 400–700 nm is 87%. Also note the very high reflectance of light polarized in the stretched direction in the visible range (400–700 nm) shown by curve c. The film has an average transmission of 2.5% for curve c between 400 and 700 nm. The % RMS color for curve b is 5%.

II. Transflective Displays

In the description of the display embodiments that follow, the system components will be shown as separate elements for simplicity of illustration. However, it shall be understood that some or more of the system components could be laminated together, or include other components such as anti-reflection coatings. The alignment of the various polarizers is indicated by arrows on the drawings. Also, the polarization of the light rays is similarly indicated by arrows in the drawings.

Figure 7:
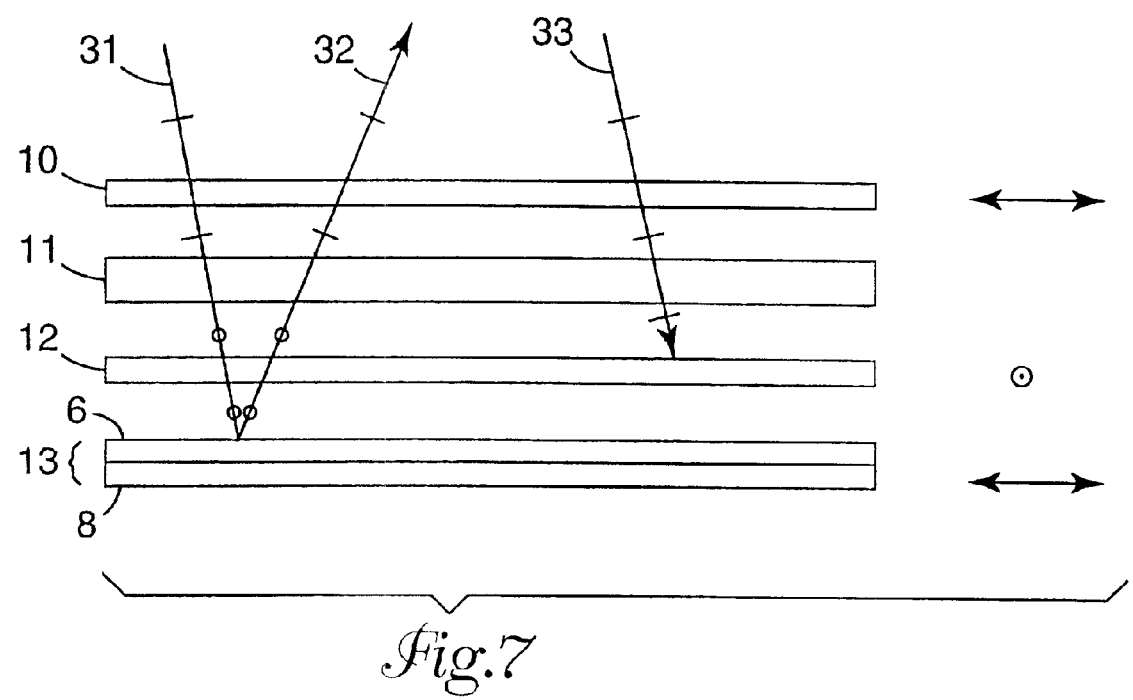
FIG. 7 shows a first embodiment of a reflective display.

FIG. 7 shows a first embodiment of a reflective display based on the present transflector 13. The display includes an LCD panel 11, front and rear dichroic polarizers 10 and 12, and transflector 13.

In the display configuration of FIG. 7, the transflector 13 is preferably aligned to maximize the reflectivity of light of the polarization transmitted by dichroic polarizer 12. In other words, the transmission axis of the dichroic polarizer 12 is aligned with the high reflectivity axis of the reflective polarizing element 8. As is the case with conventional displays, the transmission axis of the dichroic polarizer 12 is aligned with the extinction axis of the dichroic polarizer 10. Rays 31 and 33 are both of the polarization transmitted by dichroic polarizer 10. For ray 33, the liquid crystal panel 11 is in a state which transmits ray 31 without affecting its polarization. Ray 33 is then absorbed by dichroic polarizer 12. Absorption of ray 33 by dichroic polarizer 12 gives the LCD a dark appearance. For ray 31, the liquid crystal panel is in a state which rotates the polarization of ray 31 so that ray 31 is transmitted by dichroic polarizer 12, and is diffusely reflected by transflector 13 forming transmitted ray 32. (For simplicity of illustration, only one diffusely reflected ray 32 is shown. However, it shall be understood that in fact many rays are diffusely reflected by transflector 13, as described above with respect to FIG. 1.)

This reflection of ray 31 to form diffusely reflected ray 32 illuminates the LCD 11 giving the appearance of a diffuse white, neutral gray background (or greenish, depending on the polarizer absorbance in its transmission axis). The overall effect of the display of FIG. 7 is of dark characters on a diffuse light background.

The use of a highly reflective polarizing element 8 as shown in FIG. 7 can increase display brightness by over 10% compared to displays using brushed aluminum as a back reflector. Multilayer mirror films described in the above-mentioned U.S. patent application Ser. No. 08/402,041 made by biaxial orientation could also be used in this application.

Figure 8:
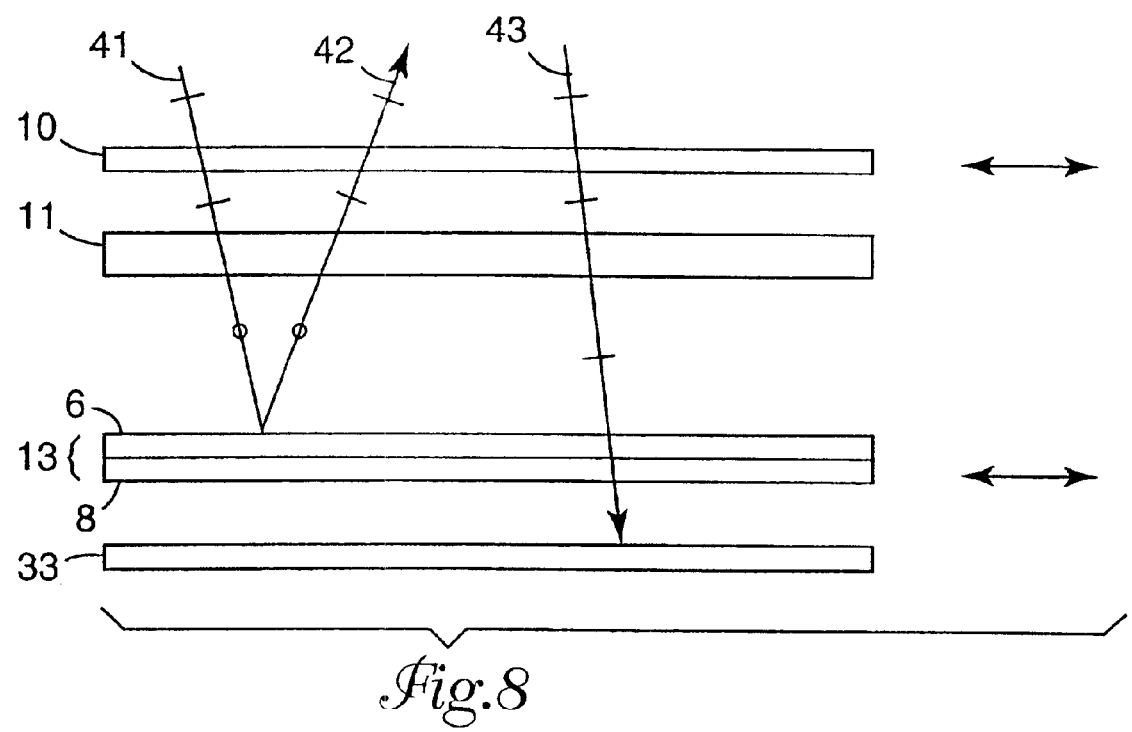
FIG. 8 shows an alternate embodiment of a reflective display.

FIG. 8 shows an alternate embodiment of a reflective display. The display includes a front dichroic polarizer 10, LCD panel 11, transflector 13, and absorber 33. Preferably, the transmission axis of the reflective polarizing element 8 is aligned with the transmission axis of the dichroic polarizer 10, as indicated by the arrows next to each polarizer in FIG. 8.

The liquid crystal panel 11 transmits ray 43 without affecting its polarization. Ray 43 is then transmitted by the transflector 13 and absorbed by absorber 33. This results in a dark pixel in LCD 11. Light ray 41 is transmitted by dichroic polarizer 10, has its polarization rotated by LCD 11 and is diffusely reflected by transflector 13 to form reflected ray 42. Reflected ray 42 is transmitted out of the display, resulting in a diffusely lit appearance. The overall effect of the display of FIG. 8 is dark characters on a diffuse light background.

The reflected intensity of ray 42 in FIG. 8 is greater than the reflected intensity of ray 32 in FIG. 7 due to the elimination of the rear dichroic polarizer 12. Elimination of the rear dichroic polarizer reduces absorption losses in the system, thus increasing display brightness and contrast. Absorptive losses associated with the rear dichroic polarizer (12 in FIG. 7) are 5 to 20% per pass, for a total of 10 to 40% loss. Elimination of the rear dichroic polarizer in FIG. 8 thus greatly reduces the losses, and dramatically increases the brightness of the display shown in FIG. 8 when compared to a standard reflective display. The display shown in FIG. 8 is 20 to 50% brighter than a standard reflective display, and is 10 to 40% brighter than the display shown in FIG. 7.

Figure 9A:
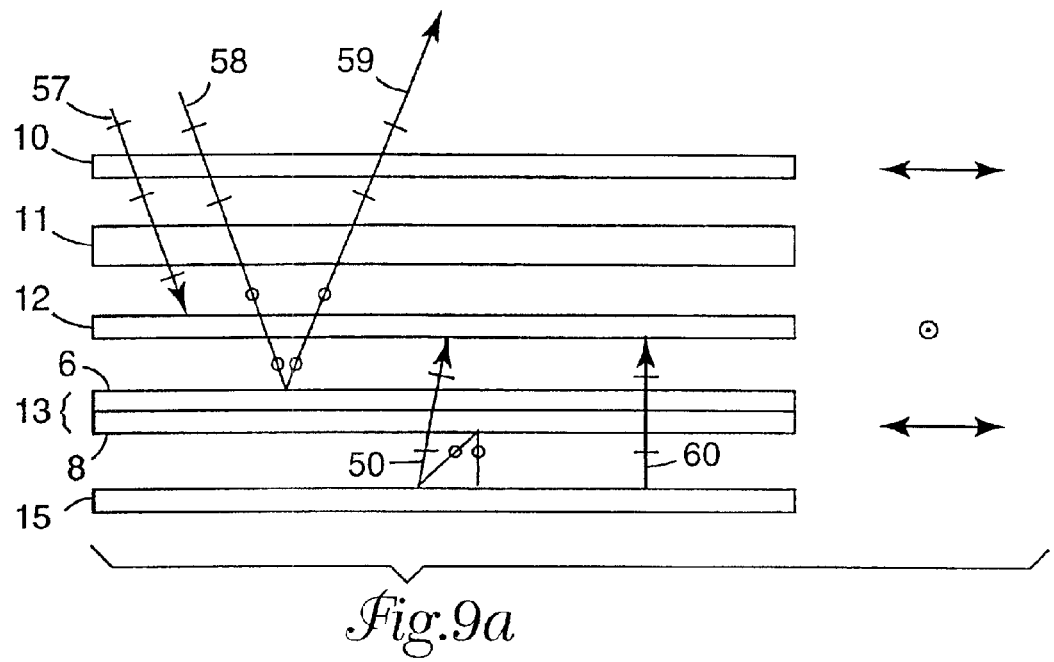
FIGS. 9A and 9B show a first embodiment of a transflective display.
Figure 9B:
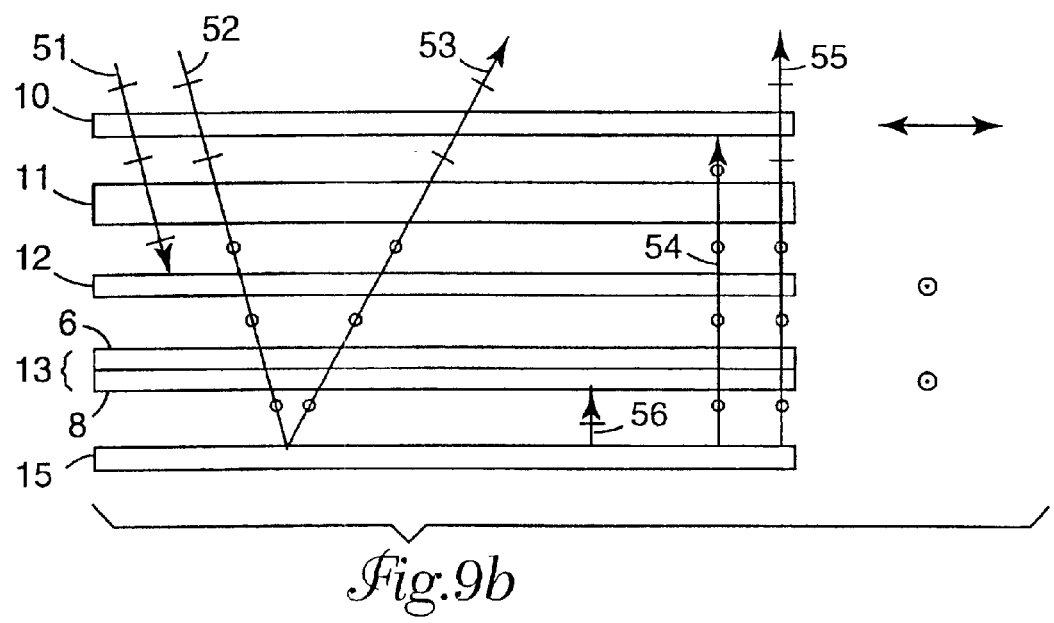

In addition to the reflective displays of FIGS. 7 and 8, the combination of a polarization preserving diffusing element 6 with a reflective polarizing element 8 can also be used as a transflective film to create transflective displays. FIGS. 9A and 9B illustrate the use of transflector 13 in a transflective display. These transflective displays include LCD panel 11, front and rear dichroic polarizers 10 and 12, transflector 13 and backlight 15.

In FIG. 9A, the high reflectivity axis of the reflective polarizing element 8 is effectively aligned with the transmission axis of dichroic polarizer 12 for ambient performance (i.e., the dichroic polarizer 12 and the reflective polarizing element 8 are "crossed" as indicated by arrows next to each polarizer in FIG. 9A). Under ambient lighting conditions, the display of FIG. 9A works in the manner as that described above with respect to FIG. 7. Ray 57 is absorbed by rear dichroic 12 and ray 58 is diffusely reflected by transflector 13 to form reflected ray 59. Under backlit conditions, ray 60 is transmitted by the transflector 13 and is absorbed by dichroic polarizer 12. Ray 50 is first reflected by transflector 13, recycled and absorbed by rear dichroic 12. However, inefficiencies in both the reflective polarizing element and the dichroic polarizer 12 mean that some light is transmitted by the transflector 13 which is properly polarized for transmission through the dichroic polarizer 12, thus, giving viewability when backlit.

For improved performance under supplemental lighting conditions the polarizer alignment of FIG. 9B is preferred. For FIG. 9B, the transmission axis of the reflective polarizing element 8 is aligned with the transmission axis of the dichroic polarizer 12. In this case, the polarization of ray 55 is changed and ray 55 is transmitted by dichroic polarizer 10. LCD 11 does not affect the polarization of ray 54 and therefore it is absorbed by dichroic polarizer 10. The overall effect is dark characters on a diffuse white background when backlit. In this embodiment, however, ambient viewability is reduced because backlight 15 is not as efficient a reflector as transflector 13 in FIG. 9A.

For the embodiments shown in FIGS. 9A and 9B, the reflective polarizing element 8 can be oriented anywhere from 0° (transmission axis of reflective polarizing element aligned with the transmission axis of the dichroic polarizer 12, as in FIG. 9B) to 90° (high reflectivity axis of the reflective polarizing element 8 aligned with the transmission axis of the dichroic polarizer 12, as in FIG. 9A). The orientation is determined by the desired performance under ambient and supplemental lighting conditions for the particular display application, the relative amount of time the display will be used under each condition, and the overall desired display appearance.

As described above with respect to the reflective display of FIG. 8, brightness in a transflective display such as that shown in FIGS. 9A and 9B can be increased by replacing the rear dichroic polarizer 12 with a transflector 13. One embodiment of such a transflective display is shown in FIG. 10.

Figure 10:
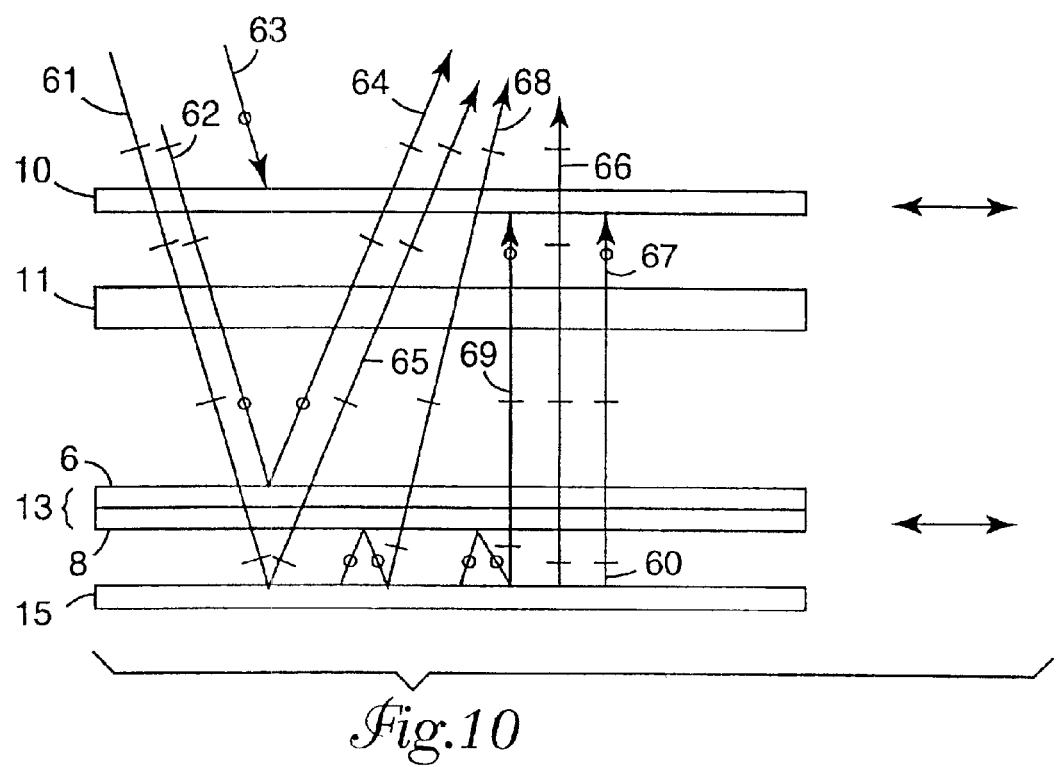
FIGS. 10, 11, 12 and 13 show alternate embodiments of transflective displays.

Under ambient lighting conditions, the display of FIG. 10 operates similarly to the reflective display of FIG. 8. Ray 61 is weakly reflected by the backlight 15, to create reflected ray 65, resulting in a darkened appearance. Ray 62 is strongly reflected by the reflective polarizing element to create reflected ray 64, resulting in a diffusely lit appearance.

When backlit, the display of FIG. 10 reverses image as compared to the same display under ambient light. When backlit, ray 67 is absorbed by front dichroic polarizer 10, and ray 66 is transmitted by front dichroic polarizer 10. Backlit ray 68 is recycled by transflector 13 thus increasing the light available for display illumination. The overall effect under backlighting in the display of FIG. 10 is of illuminated characters on a dark background. In addition, the display of FIG. 10 is potentially brighter than either conventional purely reflective or conventional purely backlit displays.

Thus, for the transflective display embodiment of FIG. 10, the contrast of the display reverses between backlit and ambient viewing. That is, if the display has dark letters against a diffuse white background under ambient lighting, the letters will be illuminated against a dark background when backlit. This effect is both striking and useful for many display applications.

For those applications where reverse imaging between ambient and backlighting conditions is not desired, control mechanisms can be added to the display to electronically invert the contrast of the display under either backlit or ambient conditions to achieve the desired display appearance.

As shown by rays 68 and 69, the reflective polarizing element 8 has a light recycling effect. Instead of being absorbed by a conventional rear dichroic polarizer, light of the nontransmitted polarization (rays 68 and 69) is instead reflected back into the backlight 15 where it is randomized. Some of this reflected light then reemerges from the backlighting system in the preferred polarization and is transmitted by the reflective polarizing element 8, thus increasing the amount of light available to illuminate the display under backlit conditions. Display efficiency, brightness and contrast are therefore increased.

Figure 11:
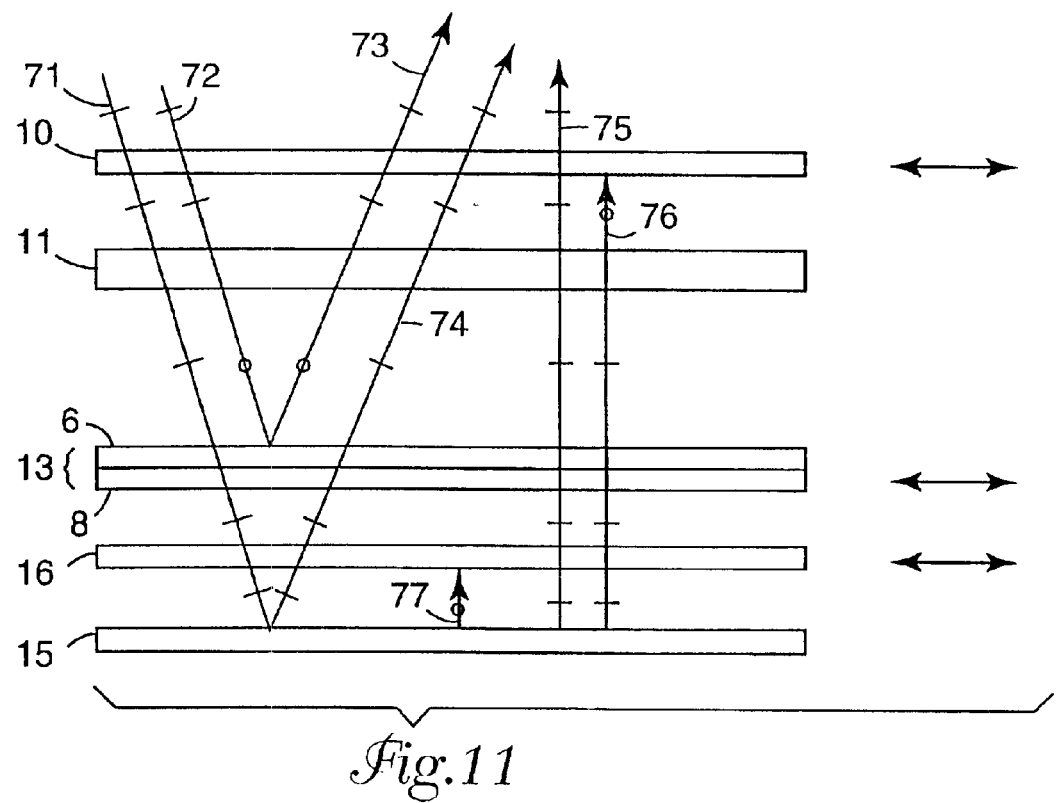

FIG. 11 shows the display of FIG. 10 and further includes a light absorbing film 16 placed between backlight 15 and transflector 13. In this embodiment, the light absorbing film 16 is preferably relatively light (i.e., a low absorption), and is present to optimize viewability under ambient lighting conditions while not significantly affecting display appearance (as compared to FIG. 10) under backlighting conditions. The light absorbing film may be a dichroic polarizer. The light absorbing film 16 absorbs some of diffusely reflected ray 74 out of backlight 15, thus increasing the effective absorption of backlight 15 and increasing display contrast under ambient lighting conditions. The overall effect under ambient lighting conditions is of diffusely illuminated characters against a dark background, and dark characters against a diffuse white background when backlit. Again, if image reversal is not desired, control electronics can be used to invert the contrast of the display under either backlit or ambient conditions to achieve the desired display appearance.

Figure 12:
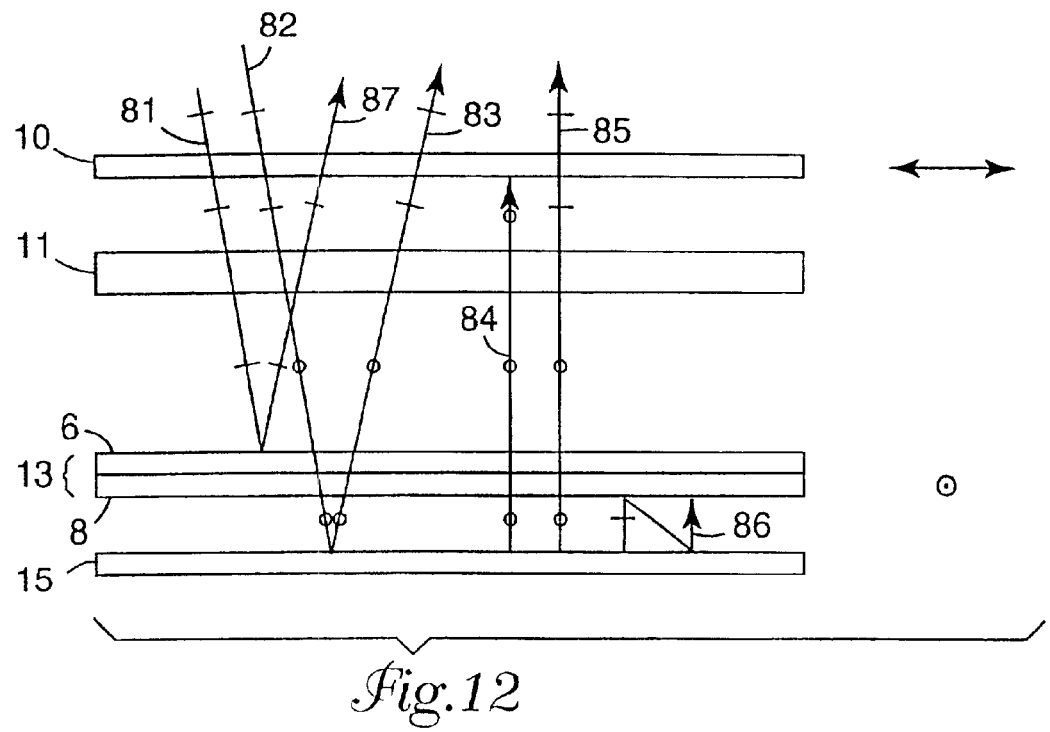

FIG. 12 shows a transflective display set up for preferred backlight viewing. The transmission axis of dichroic polarizer 10 is aligned with the high reflectivity axis of the reflective polarizing element in transflector 13. Ray 81 is reflected from transflector 13 to form reflected ray 87. Ray 82 is reflected by backlight 15 to form reflected ray 83. Ray 86 is reflected by transflector 13, ray 85 is transmitted through the display while ray 84 is absorbed by front dichroic polarizer 10. In this display configuration, the overall result is dark letters against a diffuse white background when backlit, and illuminated characters against a dark background when viewed under ambient light.

Figure 13:
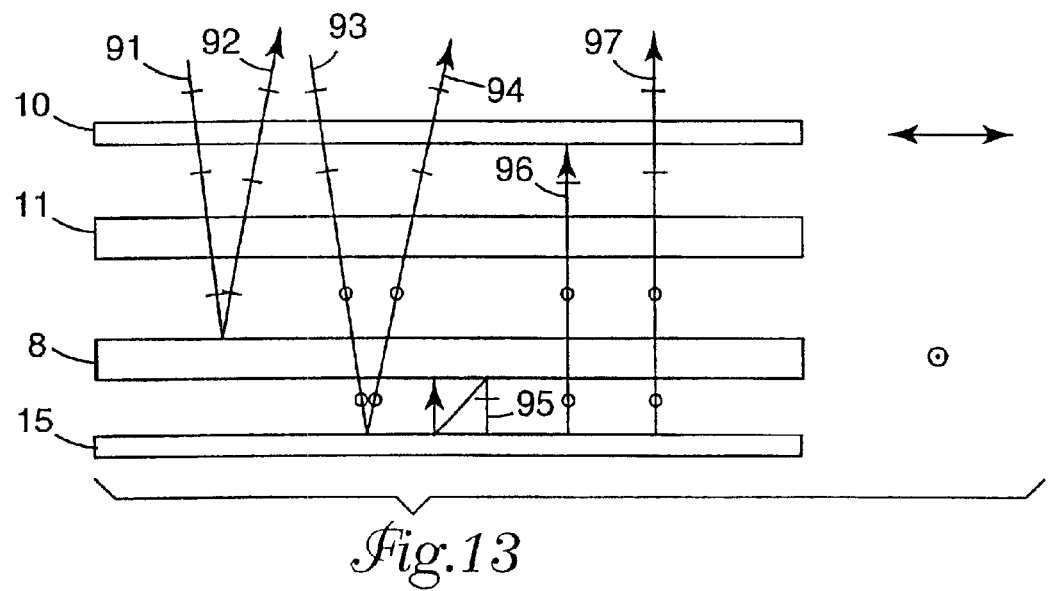

FIG. 13 shows an alternate embodiment of a transflective display wherein the transflector includes a reflective polarizing element 8 and does not include a diffusing element. The rays in FIG. 13 are affected in the same manner as the rays in FIG. 12. If, as shown in FIG. 13, the transmission axis of dichroic polarizer 10 is aligned with the high reflectivity axis of reflective polarizing element, the effect is of dark letters against a mirror-like background when backlit, and mirror-like letters against a dark background under ambient light. If the dichroic polarizer 10 and reflective polarizing element were aligned (not shown), the effect is dark letters against a mirror-like background under ambient light, and mirror-like letters against a dark background when backlit. As described above, if image reversal is not desired, control circuitry to electronically invert the contrast of the display will produce a consistent appearance under both backlit and ambient viewing conditions.

In displays where the transflector 13 is not laminated to other system components, it may be desirable to coat one or both sides of the reflective polarizing element with an antireflection coating. Anti-reflection in this case refers to the transmission axis of the transflector 13. Light traverses each component twice in a reflective LCD, and losses due to surface reflections can impact the performance of the display. An exemplary anti-reflected reflective polarizer is described in above described U.S. patent application Ser. No. 08/402,041.

Another way to increase performance of any of the above-described displays is to laminate the components together to eliminate air gaps. For example, one preferred embodiment of any of the displays shown in FIGS. 7–13 include a diffusing adhesive as the diffusing element 6 of the transflector 13. This allows the transflector to be laminated to the rear dichroic polarizer 12 in the embodiments of FIGS. 7 and 9A and 9B, or to the rear of LCD 11 in the embodiments of FIGS. 7 and 10–13. This reduces losses due to surface reflections increases throughput of the system, thus increasing display efficiency, brightness and contrast.

For example, if 12% of the light is reflected due to surface reflections on the reflective polarizing element 8, then the contrast of the display is limited to 8:1. If the reflective polarizing element is laminated to the bottom of the LCD panel, then the residual surface reflection is 6% of the bottom side of the reflective polarizing element, and the limiting contrast is 16:1. The remaining 6% can be reduced to one or two percent if an anti-reflection coating is applied to the bottom side of the reflective polarizing element 8. Contrast will increase proportionately to 100:1 or 50:1, respectively, which is a significant improvement. This analysis assumes that all other components, such as the diffuser and LC plate are laminated together. In the case of the reflective displays, the black absorber can be laminated to the back of the reflective polarizing element, or the back of the reflective polarizing element can be coated with an absorbing black ink or other suitable absorptive coating. The black absorber cannot always be laminated to the reflective polarizer because many black absorbers have rough surfaces. In such a case, it may be desirable to put an anti-reflection coating on the back side of the reflective polarizing element as described above.

We claim:

1. A reflective display, comprising
   a light modulator provided to selectively alter a polarization state of polarized light passing through the light modulator, the light modulator having a viewer side and a back side;
   a reflective polarizer positioned on the back side of the light modulator to reflect light having a first polarization state and to transmit light having a second polarization state; and
   a rear dichroic polarizer positioned between the light modulator and the reflective polarizer to allow at least a portion of light reflected by the reflective polarizer to be transmitted back through the light modulator.

2. The reflective display of claim 1, wherein the reflective polarizer comprises a plurality of layers.

3. The reflective display of claim 2, wherein a refractive index difference between at least two adjacent layers along a first in-plane axis of the reflective polarizer is greater than a refractive index difference between the at least two adjacent layers along a second in-plane axis of the reflective polarizer.

4. The display of claim 1, wherein a high reflectivity axis of the reflective polarizer forms an angle between 0° and 90° with a transmission axis of the rear dichroic polarizer.

5. The display of claim 1, further including a supplemental light source disposed behind the reflective polarizer, the display being capable of generating an image under supplemental lighting conditions using the supplemental light source or under ambient lighting conditions using light incident on the viewer side of the light modulator.

6. The display of claim 5, wherein the display reverses image between ambient and supplemental lighting conditions.

7. The display of claim 5, wherein the display has an appearance of dark pixels on a diffusely lit background under both ambient lighting conditions and supplemental lighting conditions.

8. The display of claim 1, further comprising a diffusing element disposed between the reflective polarizer and the rear dichroic polarizer.

9. The display of claim 8, wherein the diffusing element substantially maintains the polarization of light reflected by the reflective polarizer.

* * * * *